United States Patent [19]

Frey

[11] Patent Number: 4,602,855

[45] Date of Patent: Jul. 29, 1986

[54] TILTABLE MIRROR ADAPTED FOR USE BY NON-AMBULATORY PERSONS

[75] Inventor: Willi Frey, Adliswil, Switzerland

[73] Assignee: W. Schneider & Co. AG Metallwarenfabrik, Langnau am Albis, Switzerland

[21] Appl. No.: 578,519

[22] Filed: Feb. 9, 1984

[30] Foreign Application Priority Data

Feb. 15, 1983 [CH] Switzerland ............... 831/83

[51] Int. Cl.⁴ .................. G02B 5/08; A47G 1/08
[52] U.S. Cl. ..................... 350/632; 248/476
[58] Field of Search ........... 350/600, 615, 616, 626, 350/632, 631, 633, 639, 604; 248/469–474, 476, 480, 489, 495, 486, 477, 484, 485, 496; 312/224–227

[56] References Cited

U.S. PATENT DOCUMENTS

| | | | |
|---|---|---|---|
| 156,201 | 10/1874 | Barner | 312/226 |
| 1,661,899 | 2/1927 | Martens | 312/227 X |
| 2,623,435 | 10/1950 | Geis | 350/632 X |
| 3,056,495 | 10/1962 | Malachowski | 248/472 |
| 4,396,249 | 8/1983 | Aisley | 248/476 |

FOREIGN PATENT DOCUMENTS 0906098  9/1962  United Kingdom ........ 248/480

Primary Examiner—John K. Corbin
Assistant Examiner—David Lewis
Attorney, Agent, or Firm—Frishauf, Holtz, Goodman & Woodward

[57] ABSTRACT

A mirror (1) is made accessible to non-ambulatory persons, such as those confined to a wheelchair, by providing a handle (44) at its base and a mechanism, actuated by the handle, for tilting the top of the mirror forward by up to 30 degrees. The mirror is attached to its support frame on each side at a fixed upper pivot (8) and at vertically sliding middle (10) and lower (5) pivots. The pivots do not attach directly to the mirror, but rather to a collapsible articulation mechanism. In the preferred embodiment, a connecting link (9) attaches to the middle sliding pivot (10) and to a bracket (14) at the top of the back of the mirror. An upper holding arm (7) depends from the upper fixed pivot and attaches to the center of the connecting link (9). The lower sliding pivot (5) is connected by a short angle bracket (13) to the bottom of the back of the mirror. The lower end of the connecting link (9) is supported on a height-adjustable track (11). The lower anchoring bracket (13) of the mirror (1) is also held in a height adjustable track (6). A friction brake (16) at the pivot (8) is provided to keep the mirror in any desired inclination within the 30 degree rotational arc.

8 Claims, 6 Drawing Figures

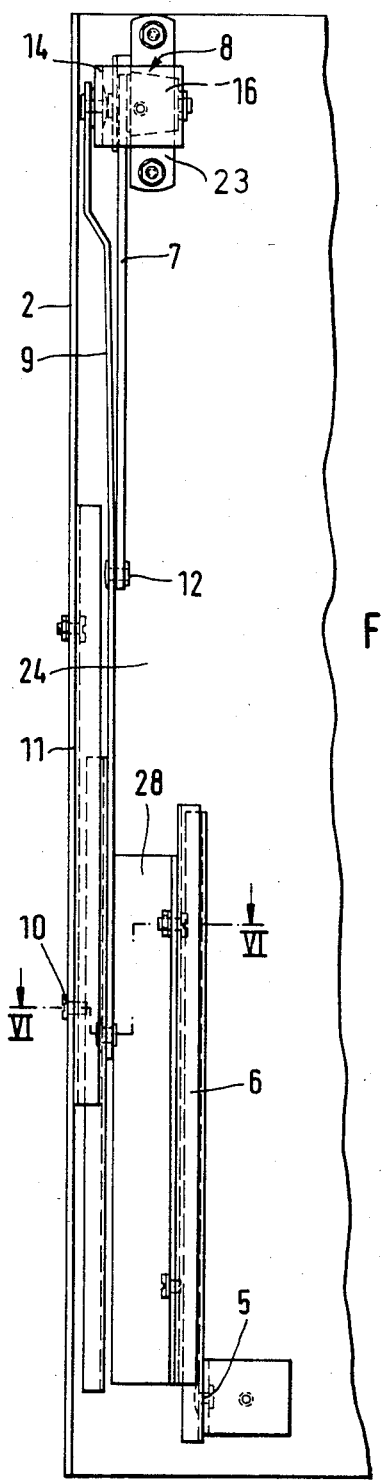
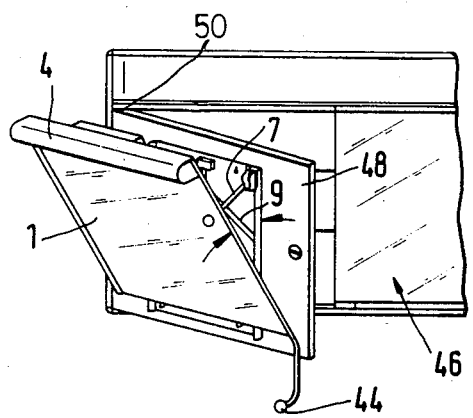
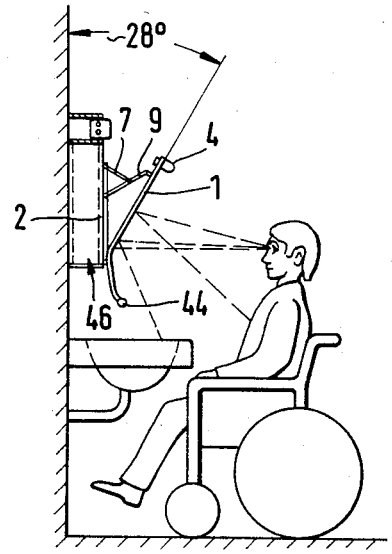
FIG. 2
FIG. 3
FIG. 4

TILTABLE MIRROR ADAPTED FOR USE BY NON-AMBULATORY PERSONS

The present invention relates generally to adjustable mirrors, and more particularly to a space-saving wall-hung mirror which can be easily manipulated by persons confined to a wheelchair.

BACKGROUND

It is conventional to mount a mirror on the door of a medicine cabinet and to hinge the mirror and door on the left or right side for rotation about a vertical axis. Such a mirror is well adapted for use by a standing person. However, a person who is confined to a wheelchair, either temporarily or permanently, and is unable to stand, generally cannot elevate his or her head sufficiently to make it visible in the mirror for purposes of shaving, applying make-up, or the like. A mirror could be suspended on a wall at an inclined angle, but such a mirror would require the wheel-chair bound person to position himself or herself at the same distance from the mirror each time and would not be useful to other members of the family.

THE INVENTION.

Briefly, applicant has discovered that these difficulties can be overcome by fashioning a tiltable mirror rotatable on a horizontal axis, which can be placed in a desired inclination within a predetermined rotational range, which will stay securely in that position, and which can nevertheless be rotated with a minimum of effort. The mirror can optionally be built into cabinets, particularly bathroom medicine cabinets.

The mirror is attached to its support frame on each side at a fixed upper pivot and at vertically sliding middle and lower pivots. The pivots do not attach directly to the mirror, but rather to a collapsible articulation mechanism. In the preferred embodiment, a connecting link attaches to the middle sliding pivot and to a bracket at the top of the back of the mirror. An upper holding arm depends from the upper fixed pivot and attaches to the center of the connecting link. The lower sliding pivot is connected by a short angle bracket to the bottom of the back of the mirror. A handle depends from the bottom of the mirror and allows the user to tilt the mirror to any desired inclination within its rotational range. A friction brake is provided at the upper pivot to hold that inclination.

A rotation of the mirror in the vertical direction doesn't require much room because the the lower pivot point moves up during rotation and is not restricted in its movement by any housing surrounding the mirror, such as a bathroom medicine cabinet.

DRAWINGS

FIG. 2 is a vertical section along line II—II of FIG. 1 through the tiltable mirror;

FIG. 3 is a perspective view of a tiltable mirror fastened on the door of a medicine cabinet;

FIG. 4 is a schematic view of a tiltable mirror on a medicine cabinet, as used by a person in a wheelchair;

DETAILED DESCRIPTION

Figure 1:
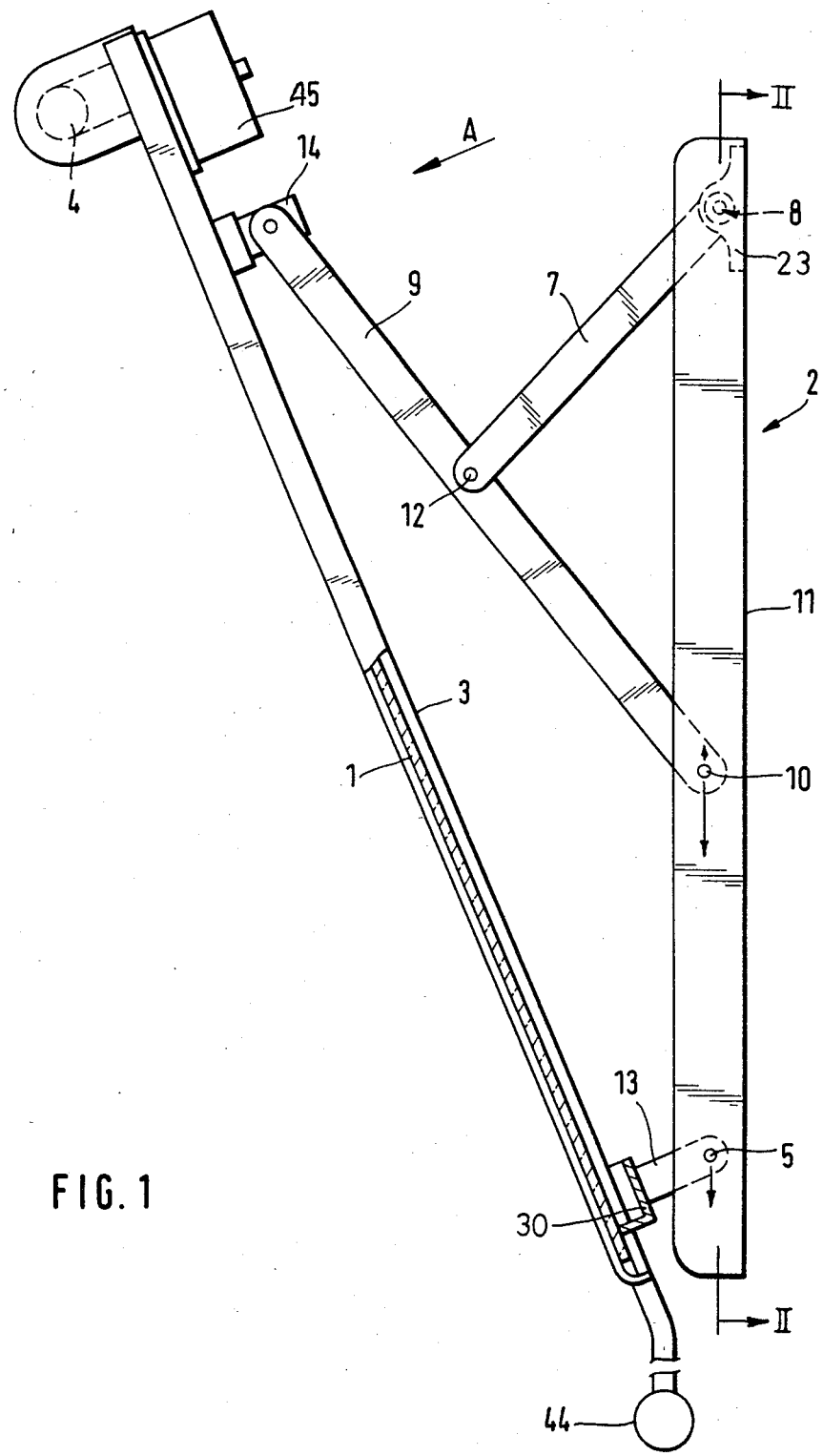
FIG. 1 is a side view of the tiltable mirror of the present invention, partially in section, at its greatest inclination.

As shown in FIG. 1, the mirror 1 is supported by a support frame 2 fastened on a wall, cabinet, cabinet door, or the like. The glass is surrounded on both sides by a mirror holder frame 3, from which project lower angle or bearing brackets 13, 14. Since the same parts are provided to the left and right, in mirror-image relation, for simplicity's sake only one side is described below. The lower angle bracket 13 adjacent the lower end of the mirror is held (FIG. 2) in a lower height adjustment track 6 by a lower pivot 5.

Figure 6:
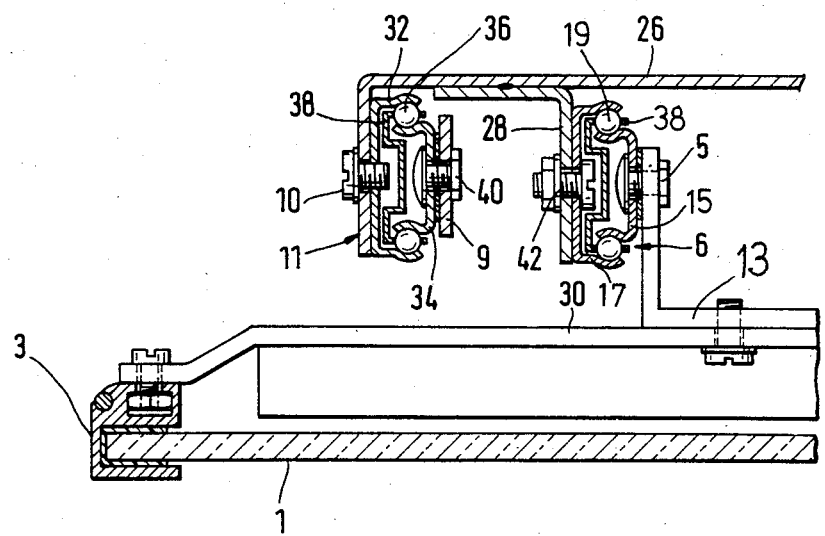
FIG. 6 is a section along line VI—VI of FIG. 2.

As shown in FIG. 6, the angle bracket 13 is firmly fastened to a crossbeam 30 connected to the mirror-frame 3. The lower adjustment track 6 contains a first, having a cross section, transverse to its major dimension or length, which is substantially U-shaped, track 15 rotatably held by the pivot 5. A second cross-sectionally U-shaped track 17 engages around the first track 15 and rolls on ball bearings 19 disposed between them, so that this second track can also be extended in the longitudinal direction. The second track 17 is firmly connected by means of at least two fastening screws 42 to a right-angled connector 28 which is rigidly attached to a track guide panel 26 which has a right-angled bend. On the panel's angled-away side surface, an upper extension track 11 is fastened. This contains a third, outer cross-sectionally U-shaped track 32, which is firmly fastened by screws 40 with the track guide panel 26. A fourth cross-sectionally U-shaped track 34 slides together with the third track 32 on bearings 36. This fourth track 34 is rotatably connected by a pivot 10 to a connecting link 9. The ball bearings 19, 36 of both extension tracks 6, 11 are carried in ball bearing cages 38.

In the upper region of the support frame 2, an arm 7 projects from the hinge 8. The arm's other end is rotatably connected to the connecting link 9. The corresponding fastening point 12 is located about in the middle of this connecting link 9. The upper end of the connecting link 9 is rotatably secured to a bearing bracket 14 projecting from the back of the top of the mirror.

A fluorescent tube 4 is mounted at the upper end of the mirror, and its lamp ballast 45 is disposed on the back side of the mirror frame 3 sufficiently high to stow above the support frame 2 when the mirror is folded up vertically. As shown in FIGS. 1 and 3, an offset, downwardly and forwardly projecting handle 44 is located at the lower end of the mirror 1, to permit the user to comfortably set the inclination of the mirror.

Figure 5:
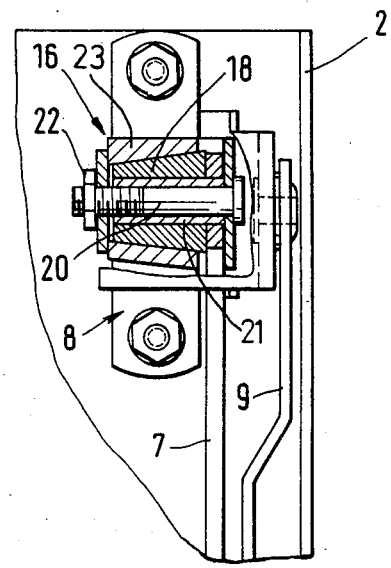
FIG. 5 is an enlarged sectional view of the friction brake used to retain the mirror at a particular inclination.

In order to maintain the mirror 1 in any desired inclination within the rotation arc of up to 30 degrees or about 20–30 degrees, an adjustable friction brake 16 is provided on the pivot 8. As shown in FIG. 5, a brake sleeve or cone 18 comprising a friction lining is located on the upper end of the arm 7. This cone 18 rests securely on a cylindrical casing 21, which is pierced by a bolt 20 provided with a screwthread. The cone 18 engages a cylindrical bore 23 of a bearing 23. The friction, and thus the resistance to rotation, can be adjusted by greater or lesser tightening of a nut 22 screwed onto the thread of the bolt 20.

OPERATION

Upon rotation of the mirror 1 in the direction of arrow A in FIG. 1, out of the vertical position, the arm 7 rotates around the fixed pivot or hinge 8. Thus, the lower end of the connecting link 9 is pulled upward.

This results in the extension track 11 being pulled vertically upward. This makes the ball bearings 36 between the third track 32 and the fourth track 34 unroll, and the connecting link 9 rotate about the sliding pivot 10. As a result of the unrolling of the ball bearings 36, the track guide 26 moves linearly upward, albeit only half way, which pulls the fourth track 34 outward. Since the track guide 26 is securely connected with the second track 17, it also moves vertically upward. This causes the ball bearings 19 to unroll, which pushes the track 15 linearly upward, albeit only half way, which pulls the track guide 26 out. Thus, the lower pivot 5 of the mirror 1 is moved upward a distance such that the lower rim of the mirror doesn't hit the bottom of the cabinet, if the mirror is built into a medicine cabinet 46 as shown in FIGS. 3-4. The friction brake 16 assures that the mirror 1 remains in any desired inclination within the rotational arc.

As shown in FIG. 3, the mirror 1 can be fastened on a cabinet door 48 rotatable about a vertical axis 50, particularly on a medicine cabinet door. FIG. 4 illustrates how the tiltable mirror 1 can be comfortably used by a person in a wheelchair or similar sitting position.

I claim:

1. A tiltable mirror, for non-ambulatory persons, having a support frame (2) adapted for essentially vertically fixed positioning;

a rigidly interconnected mirror (1), mirror holder frame (3) surrounding the mirror, and handle (44) projecting downwardly and forwardly therefrom; and adjustable connection and support means connecting the holder frame (3) for the mirror and the support frame (2), said adjustable connection and support means comprising, on each of the left and right sides of the mirror, an upper holding arm (7) connected at a pivot (8) at one end to the support frame (2) adjacent an upper portion of the support frame;

a lower bearing bracket (13) connected at one end (5) pivotally and height adjustably to the support frame (2), and at its other end to the mirror holder frame (3) at a bottom portion thereof; and an upper bearing bracket (14) of said holder frame (3);

a lower extension track (6), including interengaging sliding first (15) and second (17) tracks, each having a substantially U-shaped transverse cross-section, disposed in said support frame and holding said one end (5) of said lower bearing bracket (13) therein;

a connecting link (9), having two ends, pivotally connected at one of said ends to said upper bearing bracket (14) of said mirror holder frame (3) at an upper portion thereof, and pivotably and height adjustably connected at the other (10) of said ends to said support frame (2) intermediate the connection (8) of said upper arm (7) to said support frame (2) and the connection (5) of said lower bearing bracket (13) to said frame;

the other end of said upper holding arm (7) being pivotally connected (12) to the connecting link (9) at an intermediate portion of the connecting link (9), to permit height-adjusting movement of said one end (5) of the lower bearing bracket (13) and of the connecting link (9) along the support frame (2), and swinging movement of the upper arm (7), and hence tilting of the mirror (1) out of the plane of the support frame (2) and into a tilted position; and an upper extension track (11), comprising interengaging sliding third (32) and fourth (34) U-shaped tracks, disposed in said support frame and holding said other end (10) of said connecting link (9) therein.

2. The tiltable mirror of claim 1, further comprising fixed pivots (8) in said support frame (2) for said upper holding arms (7), and height-adjustable pivots (5) for said lower bearing brackets (13) and height-adjustable pivots (10) for said connecting links (9), which are each provided with respective extension tracks (6,11) which are vertically movable in the support frame (2).

3. The tiltable mirror of claim 2, wherein (FIG. 6) said extension tracks (6,11) are carried on respective sets of ball bearings (19,36).

4. The tiltable mirror of claim 2, wherein (FIG. 5) a friction brake (16) is built into each side of at least one of said pivots.

5. The tiltable mirror of claim 4, wherein friction brakes (16) are built into said fixed pivots (8) between said support frame (2) and said upper holding arms (7) and produce a resistance to rotation.

6. The tiltable mirror of claim 1, wherein (FIG. 1) said upper holding arms (7) are shorter than the connecting links (9), and are connected to the links (9) at fastening points (12) which are approximately in the middle of the connecting links (9), and wherein said mirror has a rotational arc of up to 30 degrees.

7. The tiltable mirror of claim 1, wherein said mirror is built into a medicine cabinet (46).

8. The tiltable mirror of claim 7, wherein (FIG. 3) the support frame (2) is fastened on a door (48) hinged on a vertical axis (50) of a medicine cabinet (46).

* * * * *